UNITED STATES PATENT OFFICE.

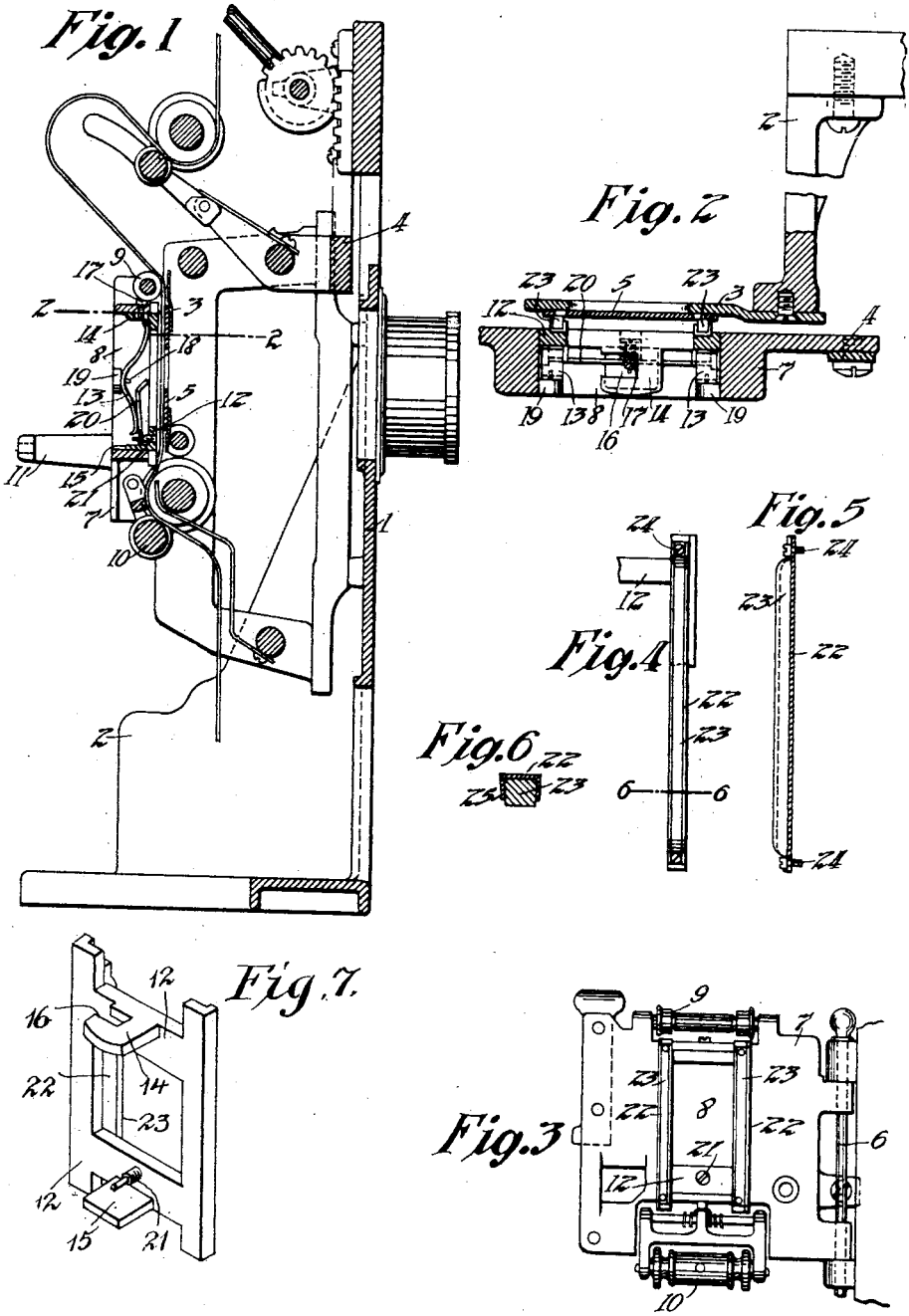

FERDINAND H. MAY, OF MONTCLAIR, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

MOTION-PICTURE-PROJECTING APPARATUS.

1,182,921.      Specification of Letters Patent.      Patented May 16, 1916.

Application filed May 4, 1912. Serial No. 695,028.

*To all whom it may concern:*

Be it known that I, FERDINAND H. MAY, a citizen of the United States, and a resident of Montclair, in the county of Essex and State of New Jersey, have invented certain new and useful Improvements in Motion-Picture-Projecting Apparatus, of which the following is a description.

My invention relates to motion picture projecting apparatus and especially to an improved film gate for such an apparatus.

The objects of my invention are to provide the film gate with improved guiding means, the film bearing surfaces of which are smoothed and unaffected by the emulsion on the film, whereby the film will be neither torn nor appreciably worn in being fed over the same, and which means when the gate is closed will yieldingly hold the film flat while it is fed past exposure position with a substantially uniform pressure irrespective of the time the apparatus has been in use; and to provide improved means for adjusting the force with which the guiding means presses against the film.

More specifically described, my invention comprises a rigid frame provided with film guiding members of suitable material, such as agate, and loosely mounted within the projection aperture of a film gate; resilient means, preferably located in the rear of the frame and out of the path of the film for yieldingly holding the frame in contact with the film when the gate is closed; and means for adjusting the resilient means.

In order that my invention may be more clearly understood, attention is directed to the accompanying drawings forming a part of this specification, in which the same reference characters are used to designate corresponding parts throughout, and in which—

Figure 1 is a longitudinal central sectional view, parts being in elevation, of a film feeding and supporting mechanism with my invention applied thereto; Fig. 2 is an enlarged section on line 2—2 of Fig. 1; Fig. 3 is a front elevation of the film gate constructed in accordance with my invention; Fig. 4 is a front elevation of a portion of the rigid frame showing one of the film guiding members and the means for attaching the same to the frame; Fig. 5 is a longitudinal sectional view of the seat for one of the guiding members, the guiding member being shown in elevation; Fig. 6 is an enlarged section on line 6—6 of Fig. 4 and Fig. 7 is an enlarged perspective view of the frame provided with the film engaging and guiding members.

Referring to the drawings, reference character 1 represents a film feeding and supporting mechanism of a motion picture projecting apparatus of any desired type, but preferably of an Edison kinetoscope. The main frame 2 of the film feeding and supporting mechanism is provided with a stationary apertured plate 3 and the auxiliary framing device 4 carries an apertured film guide plate 5 coöperating with the apertured plate 3. Pivoted to the frame device 4 by any suitable means, as by a rod 6, is a film gate 7 having an aperture 8 therein adapted to register with the apertures of plates 3 and 5 when the gate is closed. The film gate has mounted thereon the usual film guide rolls 9 and 10 and may also carry a bracket 11 for supporting a fire shutter, not shown. When the gate is closed the film is yieldingly held flat against the guide plate 5 by a rigid frame 12 loosely and slidably mounted in aperture 8 of the gate, suitable resilient means, such as springs 13, being provided to press the frame toward the film.

In order to limit the relative movement of the gate and frame, the latter is provided at the top and bottom with flanges 14 and 15 adjacent the upper and lower walls of the aperture 8 of the gate so as to allow only slight lateral movement of the frame, one of the flanges, as 14, having a slot 16 therein engaged by a pin or screw 17 projecting from the adjacent wall of aperture 8. The springs 13 are preferably bow-shaped and made of spring steel, the middle portion of the springs having apertures engaged by pins 18 carried by lugs 19 preferably formed integral with the film gate. The upper ends of the springs bear directly against the rear of frame 12 while their lower ends engage the member 20 adjustably secured to the frame by a screw 21. It will be apparent that the turning of screw 21 serves to adjust the effective tension of springs 13. Seats 22, for the reception of the film engaging and guiding members 23, are removably secured to the opposite sides of the frame 12 by suitable means, such as screws 24. The frame 12 carrying the removable seats 22 and the film engaging and guiding members 23 together with springs 13, member 20, and the parts coöperating therewith constitute film guiding means for yieldingly pressing and holding that portion of the film passing projecting position flatly against the guide plate 5.

Referring especially to Figs. 4 to 6, the seats 22 are preferably made of aluminum and are provided intermediate their ends with horizontally extending dovetailed grooves 25. The guiding members 23, which are shaped to fit grooves 25, extend beyond the sides thereof and are formed with smooth and substantially flat outer bearing surfaces. In order to prevent these bearing surfaces from becoming rough, which would cause excessive wearing and tearing of the film, I make the members 23 out of a suitable material, preferably from agate, which is unaffected by the emulsion on the film. The heads of screws 24 serve to hold members 23 in place, and when the members 23 become worn, it will be apparent that they may be readily replaced on removal of the screws.

Having now described my invention, what I claim and desire to protect by Letters Patent is:—

1. Film guiding means for a motion picture machine comprising a rigid frame, seats removably secured thereto at opposite sides thereof, and film engaging members having dovetailed connections with said seats, substantially as described.

2. As an article of manufacture, film guiding means for a motion picture machine comprising a member provided with a longitudinally extending dovetailed groove, and a film engaging portion fitting said groove and extending beyond the sides thereof, said film engaging portion having a substantially flat outer bearing surface, substantially as described.

3. As an article of manufacture, film guiding means for a motion picture machine comprising a member provided with a longitudinally extending dovetailed groove and a screw aperture at each end of the groove, and a film engaging portion fitting said groove, extending beyond the sides thereof, and having a substantially flat outer bearing surface, said screw apertures being so situated that the heads of the screws, when the screws are in said apertures, will prevent displacement of said film engaging portion, substantially as described.

4. A film gate for motion picture machines comprising an apertured member, a frame provided with film engaging surfaces loosely mounted in the aperture of said member, and resilient means for holding said frame yieldingly in contact with the film, substantially as described.

5. A film gate for motion picture machines comprising an apertured member, a frame provided with film engaging surfaces loosely mounted in the aperture of said member, resilient means for holding said frame yieldingly in contact with the film, and means for adjusting the resilient means, substantially as described.

6. A film gate for motion picture machines comprising an apertured member, a frame loosely mounted in the aperture of said member, said frame having rigid members provided with film engaging surfaces, and resilient means mounted on said apertured member and bearing on said frame for forcing the latter toward the film, substantially as described.

7. A film gate for motion picture machines comprising an apertured member, a frame loosely mounted in the aperture of said member, said frame having rigid members provided with film engaging surfaces, means for limiting the movement of said frame in said aperture, and resilient means connected with said apertured member and bearing on said frame for forcing the latter toward the film, substantially as described.

8. In a motion picture machine, the combination with the main frame of the film operating and supporting mechanism, said frame having a projection aperture, of a movably mounted rigid frame adjacent said aperture, said movably mounted frame being provided with film engaging surfaces, and means for yieldingly holding said movably mounted frame in engagement with the film, substantially as described.

9. In a motion picture machine, the combination with the main frame of the film operating and supporting mechanism, said frame having a projection aperture, of a movably mounted frame adjacent said aperture, said movably mounted frame having rigid members provided with film engaging surfaces, resilient means for yieldingly holding said movably mounted frame in engagement with the film, and means for adjusting said resilient means, substantially as described.

10. In a motion picture machine, the combination with the frame of the film operating and supporting mechanism, said frame having a projection aperture, of a movably mounted rigid frame adjacent said aperture, said movably mounted frame being provided with film engaging surfaces, means for limiting the movement of said movably mounted frame, and means for yieldingly
5 holding the movably mounted frame in engagement with the film, substantially as described.

This specification signed and witnessed this 3rd day of May, 1912.

FERDINAND H. MAY.

Witnesses:
WILLIAM A. HARDY,
ANNA R. KLEHM.

Copies of this patent may be obtained for five cents each, by addressing the "Commissioner of Patents, Washington, D. C."